Sept. 6, 1955  C. R. LEIGHTON ET AL  2,717,076
POTATO HARVESTING MACHINE
Filed Aug. 21, 1952  2 Sheets-Sheet 1
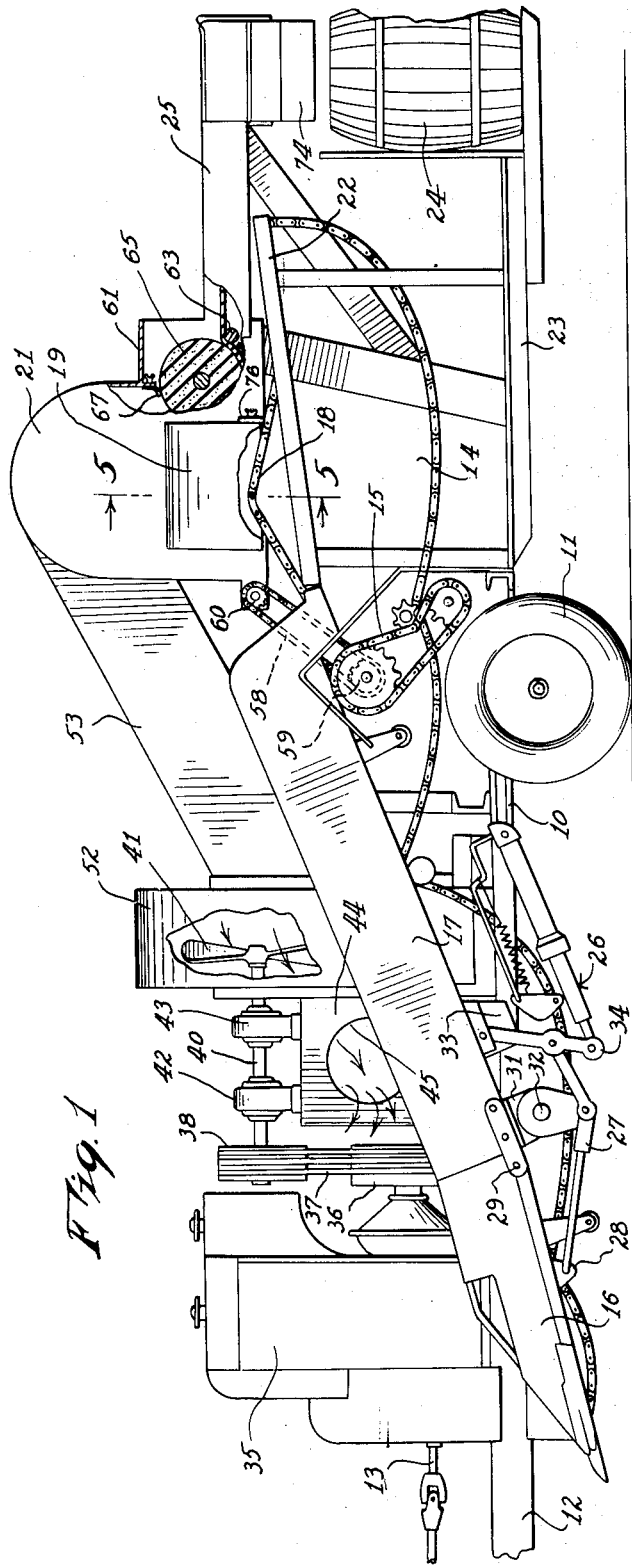
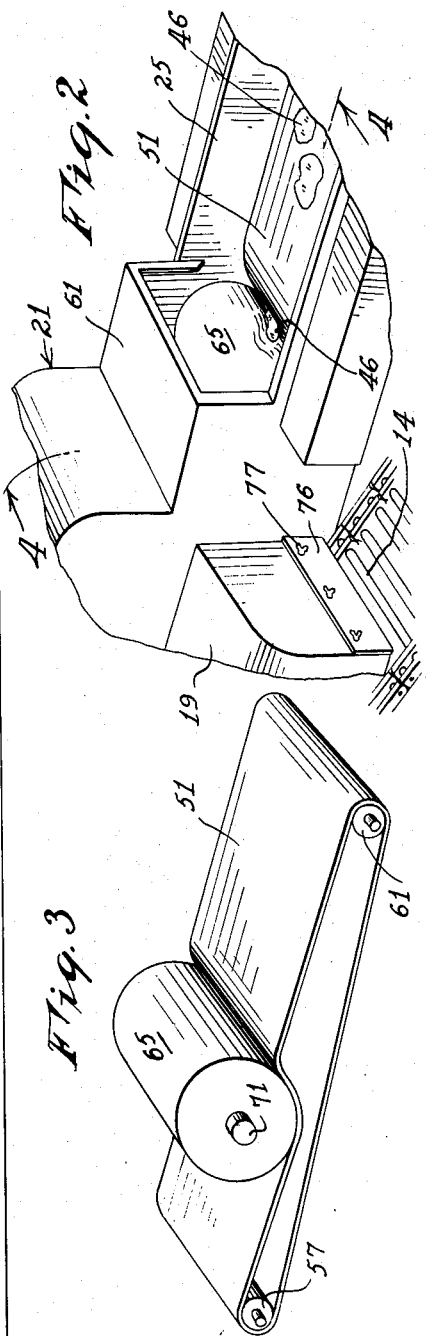
INVENTORS
CHARLES R. LEIGHTON
& NOEL D. LEIGHTON
BY
L. S. Saulsbury
ATTORNEY Sept. 6, 1955     C. R. LEIGHTON ET AL     2,717,076
POTATO HARVESTING MACHINE Filed Aug. 21, 1952                                                 2 Sheets-Sheet 2

INVENTORS
CHARLES R. LEIGHTON
& NOEL D. LEIGHTON
BY
L. S. Saulsbury
ATTORNEY 2,717,076

Patented Sept. 6, 1955

2,717,076

POTATO HARVESTING MACHINE

Charles R. Leighton and Noel D. Leighton, Limestone, Maine

Application August 21, 1952, Serial No. 305,628

3 Claims. (Cl. 209—138)

This invention relates to potato harvesting machines.

It is an object of the present invention to provide a potato harvesting machine adapted for use in a potato field having rocks and stones and which will automatically as the potato harvesting machine traverses the field remove the potatoes from the rows and pass them with such rocks and stones as are picked up to a separator that removes the potatoes from the stones and causes the potatoes to be delivered free of the stones and uninjured to a barrel or bag on the machine in which they are collected and when filled the barrels or bags will be removed from the machine.

It is another object of the invention to provide a separator for a potato harvesting machine of the above set forth type which will be free of major air leaks at the discharge opening through which the potatoes are removed from the separator.

It is another object of the invention to provide in a separator for a potato harvesting machine a belt conveyor for the removal of the potatoes from the separator over which a foam or sponge rubber roller is pressed to close off the outlet and which is indented by the potato as it travels along the belt so that the potato discharge opening is kept closed while transmitting the potatoes by the belt through the opening.

It is another object of the invention to provide in a potato harvesting machine an arrangement wherein the separator can receive the potatoes directly from the elevating or lifting conveyor and to eliminate the need for other conveyors for delivering the potatoes to the separator and whereby to keep to a minimum the number of conveyors needed for a machine of this type.

Other objects of the invention are to provide a potato harvesting machine having a separator to remove the potatoes from the rocks and stones, which is of simple construction, compact and of minimum size, easy to maintain, has efficient suction fan means that requires minimum power plant to operate the same, light in weight, and easy to pull over the field and requires a minimum number of hands to operate.

For other objects and for a better understanding of the invention, reference may be had to the following detailed description, taken in connection with the accompanying drawing, in which:

Figure 1 is a side elevational view of the potato harvesting machine embodying the features of the present invention;

Fig. 2 is a fragmentary perspective view of the machine looking into the discharge opening of the separator which is closed by the sponge rubber roller, the potatoes being discharged therefrom;

Fig. 3 is a perspective view of the discharge belt conveyor and of the compressible sponge rubber closure roller;

Figure 4:
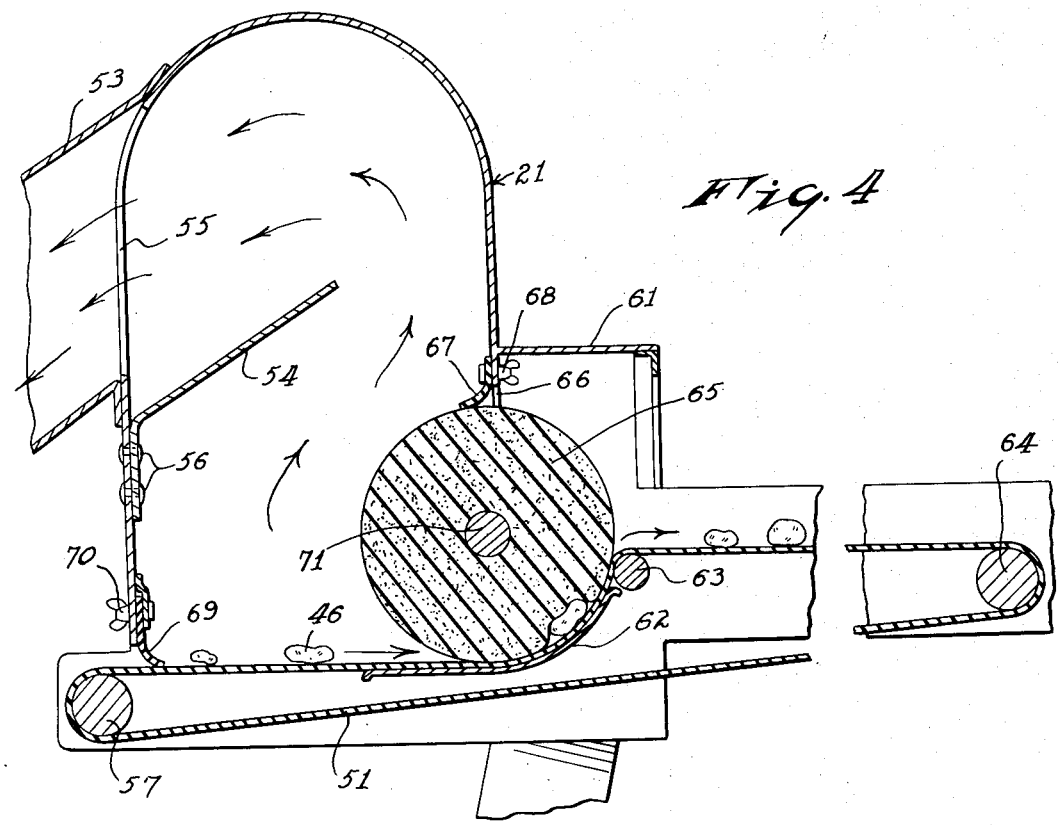
Fig. 4 is an enlarged fragmentary longitudinal sectional view taken on line 4—4 of Fig. 2.

Referring now to the figures, 10 represents a main frame having supporting wheels 11 and a forwardly extending pull bar 12 by which the machine is connected to a tractor to be pulled by the same. On the front of the machine is a flexible drive shaft 13 that is connected to a tractor to obtain rotary power for effecting the operation of various devices on the harvesting machine. This drive shaft means 13 in particular operates a chain bar conveyor 14 through a chain drive mechanism 15. The chain bar conveyor 14 extends forwardly on the machine over an vertically adjustable digging nose 16 and which will lift the potatoes upwardly and rearwardly over an inclined channel 17 to a location 18 under nose 19 of a separator arrangement 21 of the machine. In a rocky or stony field a great number of these rocks or stones are lifted with the potatoes and the potatoes must be separated from the stones. This is effected by means of the separator 21. The stones will continue to travel along the conveyor frame under the nose 19 and will be discharged from the rear end of table 22 on a rear platform 23 fixed to the rear end of the frame 10. This platform 23 supports an operator who may remove such vines that accumulate on the conveyor from time to time and who handles the barrels 24 as they are filled and are replaced by another barrel in a location under potato discharge conveyor channel 25.

The digging nose 16 is pivoted up and down by a hydraulic mechanism 26 having linkage 27 connected to the underside of the nose 16 at 28. The nose is pivoted on the lower end of the inclined channel 17 by a pivot pin 29 and the channel is supported by a bracket 31 and axle 32. The hydraulic mechanism 26 is supported upon a depending bracket 33 and lever 34.

A power plant 35 has a drive pulley 36 which through pulley belts 37 drives a pulley 38 and a fan shaft 40 having a suction fan 41. The shaft 40 is journalled in two bearings 42 and 43 mounted on an air discharge box 44 having an opening 45 through which the air and small vines are discharged.

Figure 5:
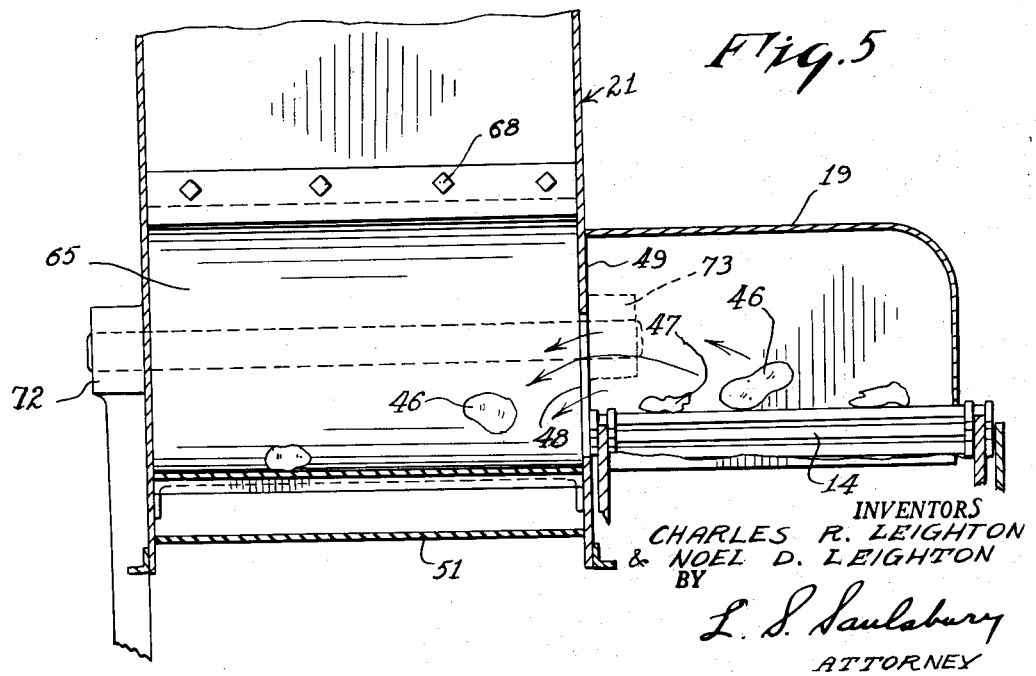
Fig. 5 is an enlarged fragmentary transverse sectional view of the separator taken on line 5—5 of Fig. 1.

The nose 19 of the separator 21 extends outwardly over the feed conveyor 14 and will, as shown in Fig. 5, draw potatoes 46, which are lighter in weight than stones 47, from the nose through an opening 48 in a side wall 49 of the separator 21. These potatoes drop onto a discharge belt conveyor 51 that extends through the bottom of the separator 21 and rearwardly along the potato discharge conveyor channel 25.

The separator 21 is connected to a suction fan box 52 by an inclined duct 53. The air draws in the potatoes 46 and after releasing the potatoes flows upwardly within the separator and rearwardly before reaching the top of the separator and along an upwardly and rearwardly extending baffle 54. The air arriving at the top of the separator passes outwardly through an opening 55 on the front of the separator and downwardly through the inclined duct 53. The baffle 54 is held in place on the front wall of the separator by rivets 56.

The potato discharge conveyor 51 covers the bottom of the separator 21 and is driven by a power roller 57 that receives its power from the chain drive mechanism 15 by a chain 58 that attaches to a sprocket 59 of the drive mechanism 15 and to a sprocket 60 on the roller 57.

The belt conveyor 51 travels at one elevation within the separator 21 and in passing outwardly through discharge compartment 61 of the separator 21 at another elevation. It is elevated by a rearwardly and upwardly curved rigid guide support 62. Above the upper end of the guide support 62 is an idler roller 63 over which the belt 51 travels and the rear end of the belt passes over a roller 64 at the outer end of the discharge conveyor channel 25.

Above the guide support 62 is a compressible sponge rubber roller 65 which serves as a closure for opening 66 between the rear wall of the separator 21 and discharge compartment 61. To fully cover the top of the opening 66 and riding on the surface of the sponge rubber roller 65 in order to cut down on air leakage, is a flexible flap 67 that is secured to the rear wall of the separator 21 by clamp bolt means 68. A similar flexible flap 69 is secured above the potato discharge conveyor 51 and to the front wall thereof by clamp bolt means 70.

The compressible roller 65 has a central metal shaft 71 with the ends thereof journalled respectively in side bearings 72 and 73, Fig. 5.

The potatoes 46 will accordingly be made to travel rearwardly by the belt 51 and will indent the surface of the sponge rubber roller 65 and move along with the belt until it is discharged on the elevated portion of the belt that lies in the potato discharge channel 25. The potatoes will continue to travel until they are finally discharged from the conveyor channel 25 and down a chute 74 and into barrel 24. The potatoes indent the sponge rubber roller 65 and are not damaged. At the same time air cannot leak between the belt 51 and the roller 65 to any great extent so as to interfere with the operation of the machine.

The stones continue to travel along the chain bar conveyor 14 and are discharged from the rear end of the table 22 onto the ground.

Any vines or dirt that may be passed into the separator 21 with the potatoes will be discharged along with the air through the opening 45 in the box 44. A flexible air flap 76 is fixed to the rear side of nose 19 by clamp bolts 77. Any air that enters the separator is taken primarily through the nose 19 and lifts the potatoes from the chain bar conveyor 14.

It should now be apparent that there has been provided a potato harvesting machine adapted to be connected to a tractor to be pulled by the same and which removes the potatoes from the potato rows of the field, elevates them to a location under the nose of a separator where the potatoes are drawn into the separator and made free of the rocks or stones on the lifting conveyor whereby the rocks and stones may continue to pass on the conveyor until dropped from the rear end of the same. The separator has a single belt conveyor lying in the bottom of the separator and a sponge rubber roller which can be indented by the potatoes so that the potatoes are not damaged and will thus prevent any air leakage into the separator between the discharge belt and the sponge rubber roller. The potato is supported on the conveyor and on a rearwardly and upwardly curved support lying under the conveyor and under the sponge rubber roller and conforming to the surface of the sponge rubber roller.

It will also be apparent that this type of machine has been greatly simplified by the present construction and that the number of conveyors for the handling of the stones and potatoes have been kept to a minimum.

While various changes may be made in the detailed construction, it shall be understood that such changes shall be within the spirit and scope of the present invention as defined by the appended claims.

What is claimed is:

1. A potato separator for potato harvesting machines comprising a housing, a nose portion having a bottom potato inlet opening and extending outwardly from the housing of the separator, power driven air suction means connected to the separator to draw the potatoes through the bottom of the nose portion, said housing having a discharge opening therein, a discharge belt conveyor extending across the bottom of the housing and through the discharge opening, a rigid upwardly curved support for the discharge belt conveyor over which the belt conveyor passes and to elevate a portion thereof, outwardly of the discharge opening, and a compressible roller in the discharge opening and conforming to the rigid belt supporting plate so as to provide an air closure means for the opening and adapted to be compressed by the potatoes traversing the discharge belt and over the rigid supporting plate of the belt, and a flexible flap on the housing extending into the discharge opening and riding over the compressible roller whereby to seal off the top of the discharge opening and to prevent air leakage over the top of the roller.

2. A potato separator for potato harvesting machines comprising a housing, a nose portion having a bottom potato inlet opening and extending outwardly from the housing of the separator, power driven air suction means connected to the separator to draw the potatoes through the bottom of the nose portion, said housing having a discharge opening therein, a discharge belt conveyor extending across the bottom of the housing and through the discharge opening, a rigid upwardly curved support for the discharge belt conveyor over which the belt conveyor passes and to elevate a portion thereof, outwardly of the discharge opening, a compressible roller in the discharge opening and conforming to the rigid belt supporting plate so as to provide an air closure means for the opening, and adapted to be compressed by the potatoes traversing the discharge belt and over the rigid supporting plate of the belt, said belt conveyor having a drive roller disposed outwardly of the bottom of the housing, an idler roller disposed at the upper end of the upwardly curved rigid conveyor supporting plate, and a further idler roller removed from the separator housing and at the discharge end of the belt conveyor.

3. A potato separator for potato harvesting machines comprising a housing having a portion adapted to extend over a potato conveyor, said portion having a potato inlet opening, power-driven air suction means connected to the housing to effect the drawing of potatoes from the potato conveyor through the inlet opening and into the housing, said housing having a potato discharge opening, a potato discharge belt conveyor extending into said discharge opening to convey the potatoes from the housing, said conveyor serving to close a portion of said opening, a rigid upwardly curved support extending through the opening and adapted to support the conveyor belt thereat, and a compressible roller freely rotatable in the discharge opening and adapted to close off the same, said roller lying immediately above the curved belt support and conforming in shape thereto, said roller adapted to encompass the potatoes, leaving the discharge opening with the belt and forcing the belt against the upwardly curved support, whereby to provide an air closure means for the discharge opening.

References Cited in the file of this patent

UNITED STATES PATENTS

| | | |
|---|---|---|
| 2,152,632 | Cassiere | Apr. 4, 1939 |
| 2,173,088 | Eissmann | Sept. 19, 1939 |
| 2,446,646 | Forrest | Aug. 10, 1948 |
| 2,612,993 | Levesque | Oct. 7, 1952 |
| 2,633,684 | Rohdin | Apr. 7, 1953 |